United States Patent Office 3,646,050
Patented Feb. 29, 1972

3,646,050
2-AMINOBENZOTHIAZOLES CONTAINING A POLYFLUOROALKANOYL OF ALKOXY-POLYFLUOROALKYL SUBSTITUENT
Audley L. Cain, Amherst, N.Y., assignor to Allied Chemical Corporation, New York, N.Y.
No Drawing. Original application May 18, 1966, Ser. No. 550,959, now Patent No. 3,480,612, dated Nov. 25, 1969. Divided and this application July 28, 1969, Ser. No. 857,259
Int. Cl. C07d 91/46
U.S. Cl. 260—305                    2 Claims

ABSTRACT OF THE DISCLOSURE

Production of certain novel 2-amino-benzothiazole compounds which serve as intermediates in the production of mono- and polyazo dyestuffs containing a polyfluoro alkanol or alkyl ether group and their corresponding quaternary ammonium salts which are particularly useful as dyes for acrylic fibers.

---

This application is a division of application Ser. No. 550,959, filed May 18, 1966 now U.S. Pat. 3,480,612, issued Nov. 25, 1969.

The present invention relates to novel mono- and polyazo dyes and dyestuff intermediates. In a specific aspect thereof it relates to novel water-soluble quaternary alkyl ammonium dyestuffs suitable for coloring polyacrylonitrile fiber.

Since the introduction into commerce of yarn and textile containing polyacrylonitrile (hereinafter briefly referred to as acrylic fibers) much research effort has been devoted to the development of dyes for these synthetic fibers. It has been proposed to dye acrylic fibers with amino dyestuffs. These compounds are converted to their quaternary alkyl ammonium derivatives by treatment with a quaternizing agent such as dimethyl sulfate and applied to the fiber from aqueous solution. The resulting quaternized dyes, however, suffer from one or more of the following disadvantages:

(1) They exhibit low affinity for acrylic fiber.
(2) They produce dyeings of poor fastness to light, washing and sublimation.
(3) They dye acrylic fiber in dull unattractive shades.
(4) They produce dyeings of poor levelness.

It is therefore an object of the present invention to provide new aminoazo dyestuffs which possess excellent fastness to light, washing and sublimation. A further object of the present invention is to prepare novel quaternary ammonium azo dyestuffs which have excellent affinity for acrylic fiber and dye it bright, attractive level shades.

These and other objects and advantages will be apparent from the following description of the invention.

In accordance with the present invention, new amino-azo dyestuffs whose corresponding water-soluble quaternary alkyl ammonium salts dye acrylic fibers in bright, level, attractive shades fast to light, washing and sublimation are produced. The new azo dyestuff intermediates are represented by the structural formula:

$$Q(Z)_n$$

wherein Q is a radical of a water-insoluble azo dyestuff and contains at least one radical of the group consisting of (a) a 2-benzothiazolylazo radical of the structure

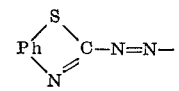

in which Ph represents a 1,2-phenylene radical and (b) an amino-aryl azo radical of the structure

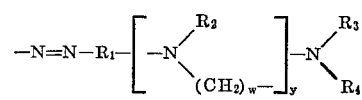

in which $R_1$ is an arylene radical selected from the benzene and naphthalene series; $R_2$ is a radical of the group which consists of hydrogen, lower alkyl (i.e. of 1 to 4 carbon atoms), lower cyanoalkyl, lower haloalkyl, and lower hydroxyalkyl; $R_3$ and $R_4$ are radicals which are each selected from the group which consists of lower alkyl, aralkyl, lower haloalkyl, lower hydroxyalkyl, lower cyanoalkyl, and which when taken together with the nitrogen to which they are attached, represent a heterocyclic ring; $w$ is an integer having a value of 2 to 4; $y$ is an integer having a value of 0 to 1, and Z is a substituent attached to an aromatic nucleus present in Q, said Z corresponding to the structure

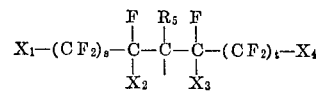

wherein $R_5$ is a radical selected from the group consisting of hydroxy and lower alkoxy; $X_1$, $X_2$, $X_3$ and $X_4$ are halogens of atomic number 9 to 35, $s$ and $t$ are integers 0 to 1, and $n$ is an integer having a value 1 to 2. Preferably $X_1$, $X_2$, $X_3$ and $X_4$ are fluorine and $s$ and $t$ are 0.

The aromatic radicals, Ph and $R_1$, in the above structural formulas may contain in addition to Z other simple substituents such as lower alkyl, lower alkoxy and halogen.

The corresponding quaternary alkyl ammonium derivatives are represented by the structural formula, $$Q^1(Z)_n{}^+A^-$$

wherein $Q^1$ is the radical of an azo dyestuff which contains as sole water-solubilizing substituent at least one quaternary azo-radical selected from the group consisting of N-alkyl-2-benzothiazoliumfumazo-radical of the structure:

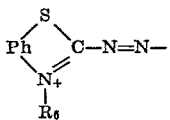

and a quaternary alkyl ammonium arylazo radical of the structure:

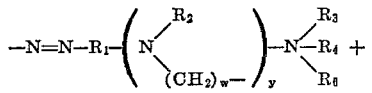

wherein Ph, $R_1$, $R_2$, $R_3$, $R_4$, $n$, $w$ and $y$ have the meanings given above, Z is a substituent of an aromatic nucleus of Q' and has the meaning given above, $R_6$ is an alkyl group selected from the group $a$, lower alkyl and aralkyl and $A^-$ is a water-soluble inorganic or organic anion.

A preferred class of dyestuffs according to the present invention are monoazo dyestuffs of the structure

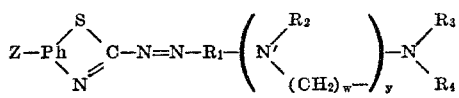

wherein Z, Ph, $R_1$, $R_2$, $w$, $y$, $R_3$ and $R_4$ have the above assigned meanings and the corresponding quaternary alkyl ammonium salts thereof.

The mono- and polyazo dyestuffs of the invention, which are presented by the formula $QZ_n$, are prepared by diazotizing an amine of the structure

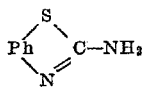

or of the structure

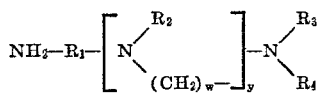

wherein Ph, $R_1$, $R_2$, $R_3$, $R_4$, $w$ and $y$ are as defined above, and coupling the diazotized amine with a coupling component wherein said amine, or acid coupling component or both contain a Z group as defined above, as a substituent on an aromatic nucleus; or the instant novel azo-dyestuffs of the formula $QZ_n$ are prepared by coupling a diazotized amine containing at least one aromatic nucleus with a coupling component of the structure

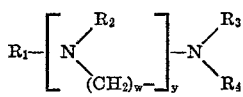

wherein $R_1$ is an aryl radical selected from the benzene and naphthalene series and $R_2$, $R_3$, $R_4$, $w$ and $y$ are as defined above, and wherein the diazotized amine, or the coupling component, or both contain the group Z defined above, as a substituent on an aromatic nucleus.

The quaternary alkyl ammonium dyestuffs of the instant invention, represented by the formula $Q^1(Z)_n{}^+A^-$ are prepared by quaternizing the novel Z-containing azo-compound obtained from the above-described coupling reaction with an alkylating agent, or by coupling a diazotized amine with a coupling component as described above but wherein the coupling component has been quaternized. The instant novel dyesuffs in their unquaternized form are converted to the corresponding quaternary alkyl ammonium derivatives by treatment with conventional alkylating agents.

Suitable diazotizable amines containing Z wherein the substituent $R_5$ according to the above structural formula is hydroxy can be prepared by admixing the appropriate haloketone with an aromatic amine in the presence of a sulfonic acid catalyst as is fully described in copending U.S. patent application Ser. No. 329,889, filed Dec. 11, 1963.

Suitable coupling components containing Z in which $R_5$ is hydroxy can be prepared in accordance with the methods disclosed in French Pat. 1,325,204 and copending U.S. patent application Ser. No. 327,520, filed Dec. 2, 1963. Diazotizable amines and coupling component containing Z in which $R_5$ represents a lower alkoxy group are novel compounds which can be prepared by treating the aforementioned diazotizable amines and coupling components with a conventional alkylating agent, e.g. dimethyl sulfate.

Typical amines which can be employed in preparing the novel dyestuffs include p-amino-alpha,alpha-bis(trifluoromethyl)-benzyl alcohol
4-amino-3,5-dimethyl-alpha,alpha-bis(chlorodifluoro-
   methyl)-benzyl alcohol
p-amino-alpha,alpha-bis(trifluoromethyl)-benzyl alcohol,
   methyl ether
2-aminobenzothiazole
p-amino-2-chloro-alpha,alpha-bis(trifluoromethyl)-
   benzyl alcohol
2-amino-alpha,alpha - bis(trifluoromethyl) - 4 - biphenyl
   methanol
alpha,alpha-bis(trifluoromethyl)-p-(4' amino-2',5'-
   dimethoxyphenylazo)-benzyl alcohol
alpha,alpha-bis(trifluoromethyl)-p-(4'-amino-2',5'-di-
   methoxyphenylazo)-benzyl alcohol, methyl ether
2-amino-alpha-alpha-bis(chloro-difluoromethyl)-6-benzo-
   thiazole methanol
4-amino-2-methyl-alpha,alpha-bis(chlorodifluoromethyl)-
   benzyl alcohol
4-amino-3-methoxy-alpha,alpha-bis(trifluoromethyl)-
   benzyl alcohol
4-amino-3-methoxy-alpha,alpha-bis(pentafluoroethyl)-
   benzyl alcohol
4-amino-3-ethoxy-alpha,alpha-bis(trifluoromethyl)
   benzyl alcohol
4-nitro-o-anisidine
5-chloro-o-anisidine
2-ethoxyaniline
aniline
p-toluidine
2-amino-alpha,alpha-bis(trifluoromethyl)-6-benzothiazole
   methanol
2-amino-alpha,alpha-bis(trifluoromethyl)-6-benzo-
   thiazole methanol, methyl ether
2-amino-alpha,alpha-bis(chlorodifluoromethyl)-6-benzo-
   thiazole methanol, methyl ether Preferably a 2 - amino - benzothiazole containing the aforementioned group Z as substituent in the phenylene ring of the benzothiazole nucleus is employed and especially a 2 - amino-alpha,alpha - bis(trifluoromethyl) - 6-benzothiazole methanol. The aforementioned 2-amino-benzothiazoles containing Z are novel compounds which are readily prepared from anilines containing Z as a substituent of the benzene nucleus and having at least one position ortho to the amino group substituted with hydrogen.

The Z-containing 2-amino-benzothiazoles are prepared by conventional procedures for example by halogenating the reaction product of the aforementioned Z-containing aniline and an alkali metal thiocyanate in accordance with the procedure of U.S. Pat. 2,773,054.

Typical coupling components which can be employed in preparing the novel dyestuffs of the invention include:

diethylaniline
dimethylaniline
trimethylanilinium metho-sulfate
phenol
anisole
N,N-bis(beta-hydroxyethyl)m-toluidine
N-ethyl-N-(beta dimethyl aminoethyl) aniline
2-(N-ethyl-m-toluidine)ethyl-trimethyl ammonium methosulfate
2-(N-[2-cyanoethyl]-m-toluidine)ethyl-trimethyl ammonium metho-sulfate
N,N-dimethyl-2,5-dimethoxyaniline
2-(N-[2-methoxyethyl]-m-toluidine)ethyl-trimethyl ammonium metho-sulfate
N-phenyl morpholine
N-ethyl-N-(beta-chloroethyl)-m-toluidine
N-(beta-cyanoethyl)-N-(alpha-hydroxypropyl)aniline
N,N-bis-(beta-hydroxyethyl)-m-chloroaniline
N-ethyl-N-(beta-cycloethyl)aniline
2-(N-ethylanilino)ethyl trimethyl-ammonium methosulfate
4-dimethylamino-alpha,alpha-bis(trifluoromethyl)benzyl alcohol,
N,N-diethyl-alpha-naphthylamine
N-(1-naphthyl)morpholine
N-benzyl-N-ethylaniline
1-dimethylamino-alpha,alpha-bis(trifluoromethyl)-2-naphthalene-methanol Preferably aryl amine and quaternary alkyl ammonium salts thereof which couple in the position para to the amino nitrogen are employed as coupling components.

Particularly good dyestuffs are obtained by employing a 2-(N-ethylanilino) ethyl trimethyl ammonium salt as the coupling component.

Dyestuffs containing two Z groups are obtained by coupling a Z containing diazotizable amine with a Z containing coupling component. For example,

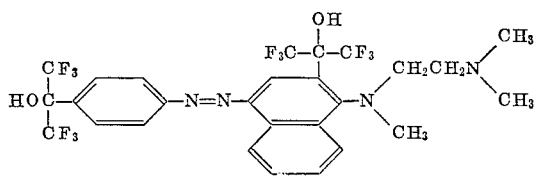

is prepared by coupling diazotized p-amino-alpha,alpha-bis(trifluoromethyl)benzyl alcohol with 1-(N-methyl, N-dimethylaminoethylene)-alpha,alpha-bis(trifluoromethyl) 2-naphthalene methanol.

The quaternary ammonium derivatives of the aryl amine coupling components and aryl amino azo dyestuff-intermediates of the invention are prepared by known alkylation procedures, i.e. by reaction of the amine and an alkylating agent such as dimethyl sulfate; a lower alkyl chloride, bromide or iodide, benzyl chloride; methyl p-toluene sulfonate and the like. The quaternization reaction is advantageously effected in an inert organic diluent such as, o-dichlorobenzene, in order to obtain a fluid reaction medium.

The anion $A^-$ in the quaternary compound is an organic or inorganic water soluble ion including $Cl^-$, $Br^-$, $I^-$, $HSO_4^-$, $H_2PO_4^-$, $ZnCl_3^-$, $CH_3SO_3^-$, $C_2H_5SO_3^-$, $C_6R_5SO_3^-$, $HCOO^-$, $CH_3COO^-$, $C_6H_5COO^-$, and the oxalate, tartrate and citrate ion.

The anion $A^-$ may be introduced by the alkylating agent, e.g. dimethyl sulfate (providing methosulfate anion) or the anion may be introduced in salting out the quaternary compound from the quaternization reaction mass for example by addition of zinc chloride (providing the trichlorozincate anion).

The quaternary mono- and polyazo dyestuffs have excellent affinity for acrylic fiber (either alone or in blends with other textile fibers) and dye it in attractive level shades fast to light, washing and sublimation. The lightfastness and/or levelness of the new quaternary dyes containing the group Z are in general superior to the lightfastness and/or levelness of quaternary dyes of analogous structure which contain negative substituents e.g.

$$CH_3SO_2—, —NO_2$$

instead of Z. The quaternary dyes of the invention being water soluble are applied to acrylic fiber from aqueous solution preferably at the boil. Preferably the new dyes are applied from mildly acidic aqueous dyebaths of pH ca. 3 to 6.

The unquaternized amino azo dyestuff intermediates of the invention are water-insoluble dyes for synthetic hydrophobic fibers such as polyethylene terephthalate (Dacron), cellulose acetate and particularly super-polyamide fiber for example polyhexamethylene adipamide (nylon 66). The unquaternized aminoazo dyes being water insoluble are applied according to the well-known disperse dyeing technique wherein the color is applied to the fiber from an aqueous dispersion of the dyestuff with the aid of a dispersing agent e.g. sodium lignosulfonate.

In the following examples which serve to illustrate the preparation of the novel dyes and dyestuff intermediates of my invention, parts are by weight unless otherwise noted and temperatures are in degrees centigrade.

EXAMPLE 1

Part A: Over a period of about 85 minutes a solution of 88 parts (0.55 mole) of bromine in 100 parts by volume of glacial acetic acid is charged to an agitated solution of 130 parts (0.5 mole) of p-amino-alpha,alpha-bis (trifluoromethyl) benzyl alcohol and 87 parts (1.1 mole) of sodium thiocyanate in 740 parts by volume of glacial acetic acid which is maintained at 25–35° C.

The reaction mass is agitated at ambient temperature for 24 hours and drowned in 6000 parts of water. A solution of 180 parts anhydrous sodium acetate in 2000 parts of water is added and the mixture is agitated for three hours at ambient temperature and filtered. The yellow solid which is collected is washed with water and dried in vacuo at 45–50°. There is thus obtained 155 parts (98% of theory) of 2-amino-alpha,alpha-bis(trifluoromethyl)-6-benzothiazole-methanol (M.P. 285–289°; M.P. after recrystallization from aqueous methanol, 295–297.2°) of the structure:

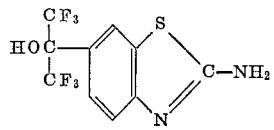

Part B: The product of Part A above is diazotized according to the following procedure:

Propionic acid (10 parts by volume) and acetic acid (20 parts by volume) are charged to a suspension of 6.4 parts (0.02 mole) of 2-amino-alpha,alpha-bis(trifluoromethyl)-6-benzothiazolemethanol in 10 parts by volume 95% aqueous sulfuric acid which is maintained below 35°. The resulting mixture is cooled to $-10°$. Sodium nitrite (1.5 parts) is charged to 10 parts by volume of 95% sulfuric acid at 70–75° and the resulting solution of nitrosylsulfuric acid is cooled to 20° C. Over a ten minute period the nitrosyl sulfuric acid is added under agitation to the aminobenzothiazole solution which is maintained below —5° during addition. The reaction mass is agitated for 3 hours at —10 to —5°. Over a period of one hour, 30 parts of water are charged to the mixture which is maintained below 0° during addition. Urea (1 part) is charged to the diazonium salt solution to destroy excess nitrosyl sulfuric acid.

EXAMPLE 2

Part A: Dimethyl sulfate 30.1 parts (0.24 mole), is charged to a mixture of 83.2 parts (0.2 mole) of 2-amino-alpha,alpha-bis (trifluoromethyl) - 6-benzothiazolemethanol (prepared as described in Example 1, Part A), 400 parts by volume ethyl alcohol (U.S. grade 2B) and 14 parts by volume 50° Bé. aqueous sodium hydroxide at 70°. The mixture is heated at about 95° for two hours, cooled to ambient temperature, drowned with agitation in 1000 parts of water and filtered. The yellow solid which is collected is washed with water and dried in vacuo at 45–50°. There is thus obtained 64 parts (96% of theory) 2 - amino-alpha,alpha-bis (trifluoromethyl) - 6-benzothiazolemethanol, methyl ether having the structure:

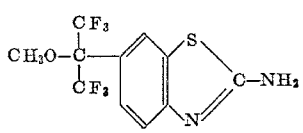

After recrystallization from a mixture of 500 parts by volume of methanol and 300 parts of water the product has a melting point of 321.2–323.6°.

Part B: The product of Part A above is diazotized with nitrosyl sulfuric acid substantially as described in Example 1, Part B.

EXAMPLE 3

Part A: A diazonium salt solution prepared from 6.4 parts of 2-amino-alpha,alpha,bis (trifluoromethyl)-6-benzothiazole methanol as described in Example 1, Part B is charged to an agitated mixture of 3.9 parts (0.02 mole) of N,N-bis (beta-hydroxyethyl)m-toluidine, 3 parts by volume of aqueous 38% hydrochloric acid, 100 parts of water and 50 parts of ice which is maintained at 0–5° during the addition. The coupling mass is agitated for about one hour at 0°. A solution of 100 parts of sodium acetate in 500 parts of water is charged until the reaction mixture gives a neutral reaction with Dark Congo indicator. The reaction mixture is agitated for 20 hours at 0–5° and heated to ambient temperature and filtered. The filter cake is washed with water and dried in vacuo at 45–50°. There is thus obtained 8.3 parts (80% of theory) of the dyestuff of the structure:

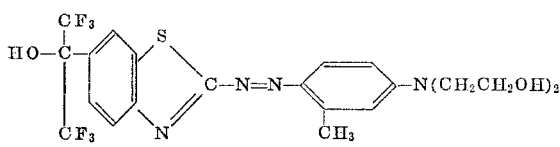

This dyestuff when dispersed in water dyes nylon 6,6 (polyhexamethylene adipamide) and cellulose acetate in attractive bluish red shades.

Part B: The dyestuff of Part A above (4 parts, 0.00765 mole) and 200 parts by volume of o-dichlorobenzene are agitated for 30 minutes at 150° to form a uniform slurry. Over a period of 5 minutes a solution of 0.87 parts by volume of dimethyl sulfate in 8 parts by volume of o-dichlorobenzene is charged dropwise to the reaction mass which is maintained at 125–130° during addition. The mixture is heated at 125–130° for an additional two hours, cooled to ambient temperature, and filtered. The filter cake is washed with Skellysolve C (a petroleum hydrocarbon fraction boiling point 88–98° Skelly Oil Co.) and agitated in 25 parts by volume of methanol and 25 parts by volume of acetic acid to form a uniform slurry. After addition of 275 parts of water and a solution of 10 parts zinc chloride in 20 parts of water, the mixture is heated at 60° for 15 minutes, and cooled to ambient temperature. Sodium chloride (20 parts) is charged and the mixture is filtered. The solid which is collected is dried in vacuo at 45–50° C. There is thus obtained 3.8 parts of the dyestuff of the structure

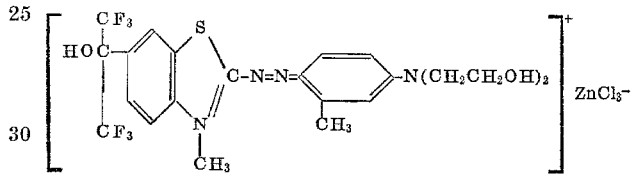

The above color after being ground with 7.49 parts of sucrose and 0.1 part of Deo-Base (a kerosene antidusting agent, Sonneborn Chemical and Refining Corp.) dyes Orlon 42 polyacrylonitrile fabric from an aqueous acetic acid bath (pH 5.5) in levelfast attractive reddish violet shades.

EXAMPLE 4

Part A: A solution of 3 parts of dimethyl sulfate in 5 parts by volume of toluene is added to a solution of 3.84 parts (0.02 mole) of N-ethyl-N-(beta-dimethyl aminoethyl)aniline (prepared in accordance with the method described in U.S. Pat. 3,119,809) in 45 parts by volume of toluene at 60°. The mixture is heated at 95° for 30 minutes. After addition of 150 parts of water, the reaction mass is heated at 95° for an additional 15 minutes, cooled to ambient temperature and allowed to stratify. The lower aqueous layer containing 2-(N-ethylanilino)-ethyl trimethyl ammonium methosulfate is separated, diluted with 200 parts of water and cooled to 0°.

Part B: A diazonium salt solution which has been prepared from 6.4 parts (0.02 mole) of 2-amino-alpha,alpha-bis(trifluoromethyl)-6-benzothiazolemethanol by the procedure of Example 1, Part B above is added to the aqueous 2-(N-ethylanilino) ethyl trimethylammonium methosulfate which is agitated at about 0° during the addition. A solution of 150 parts of anhydrous sodium acetate in 500 parts of water is added to the coupling mass until the mixture is neutral to Dark Congo indicator. The reaction mass is agitated for 20 hours at 0 to 5° and heated to ambient temperature. Sodium chloride (50 parts) and a solution of 5 parts of zinc chloride in 10 parts of water are charged, precipating a red tarry product. The supernatant aqueous liquor is decanted and the crude product is dissolved in 400 parts of water at 80°, and heated at 95° with 1 part of Nuchar (adsorbent carbon, West Virginia Pulp and Paper Co.) for 15 minutes. The carbon is removed by filtration and the solution is cooled to ambient temperature. Sodium chloride (10 parts) and a solution of 5 parts of zinc chloride in 10 parts of water are charged and the mixture is agitated for 3 hours. The dyestuff which precipitates is recovered by filtration and dried in vacuo at 45–50°. There is thus obtained 9.8 parts of a red water-soluble dyestuff corresponding to the structure

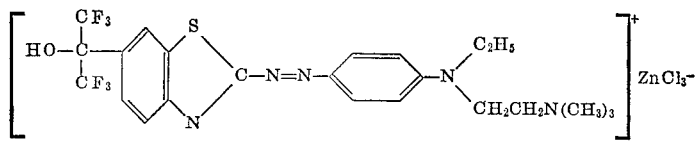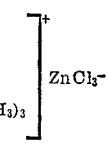

The above color after being ground with an equal weight of dextrin (an intermediate hydrolysis product of starch) dyes Orlon from an aqueous acetic acid bath in level brilliant yellow-red shades which are fast to washing and sublimation and particularly to light. Thus a 1% dyeing of Orlon of the color has a lightfastness of about 85 Standard Fade-O-meter Hours as measured by the procedure described in Technical Manual of The American Association of Textile Chemicals and Coloration, 1962, p. B-61.

EXAMPLE 5

Part A: According to the procedure of Example 3, Part A, the diazonium salt obtained from 12.8 parts 2-amino-alpha,alpha-bis (trifluoromethyl)-6-benzothiazole methanol is coupled with 5 parts of dimethylaniline to provide 13.5 parts of the dyestuff having the structure

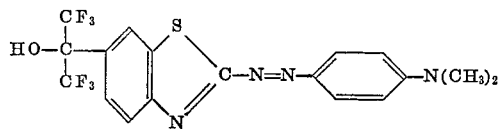

This compound is an excellent red disperse dye for cellulose acetate, nylon 6,6 and Dacron.

Part B: A solution of 2.1 parts by volume of dimethylsulfate in 5 parts by volume of toluene is charged to an agitated solution of 8.8 parts of the above dyestuff in 300 parts by volume of toluene which is maintained at 100–110°. The reaction mass is agitated for 24 hours at the latter temperature, cooled and filtered. The filter cake is washed with petroleum ether and dried in vacuo at 45–50° to provide 12 parts of a water-soluble dyestuff corresponding to the structure

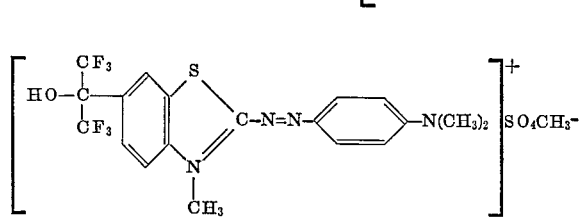

The above dyestuff after being ground with an equal weight of dextrin dyes Orlon from an aqueous acetic acid bath in an attractive level wash-fast reddish blue shade. The dyeing obtained has a lightfastness of about 40 s.f.h. as measured by the procedure of Example 4.

EXAMPLE 6

Part A: A solution of 6.5 parts (0.025 mole) of 4-amino-alpha,alpha-bis (trifluoromethyl) benzyl alcohol in a mixture of 8 parts by volume of 20° Bé. aqueous hydrochloric acid and 100 parts of water is diazotized at 0–5° by treatment with a solution of 1.8 part of sodium nitrite in 15 parts of water.

Part B: A 4 part sample (0.026 mole) of 2,5 dimethoxyaniline is dissolved in a mixture of 200 parts of water and 5 parts by volume of 20° Bé. aqueous hydrochloric acid and heated at 50–60° with 0.5 part Nuchar for 15 minutes.

After removal of the Nuchar by filtration the solution is cooled to 0–5° and the diazonium salt solution is added. The coupling mass is agitated for one hour at 0–5° and buffered by treatment with aqueous sodium acetate solution as described in Example 4. The mixture is agitated for two hours at 0–5°, heated at 70° for 15–20 minutes, cooled to ambient temperature and filtered. The orange solid which is collected is washed with water and dried in vacuo at 45–50°. There is thus obtained 10.2 parts (96% of theory) of an azo compound of the structure

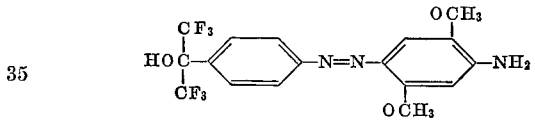

Part C: A 8.6 part (0.02 mole) portion of the azo compound is dissolved at 80° in a mixture of 50 parts by volume of acetic acid, 15 parts by volume of propionic acid 10 parts by volume of 95% sulfuric acid and 10 parts of water and diazotized with nitrosyl sulfuric substantially in accordance with the procedure of Example 1, Part B. A 4.4 part (0.02 mole) sample of N-ethyl-N-(beta-dimethylaminoethyl) m-toluidine is converted to 2-(N-ethyl m-toluidino) ethyl trimethyl ammonium methosulfate by treatment with dimethylsulfate substantially in accordance with the procedure of Example 4, Part A. The diazonium salt solution and the quaternary salt are then coupled by a procedure analogous to that of Example 4, Part B. The crude coupling product is recovered by filtration of the coupling mass, washed with 100 parts by volume of 5% aqueous sodium chloride and dried in vacuo at 50–55°. There is thus obtained 13.0 parts of a water soluble diazodyestuff corresponding to the structure

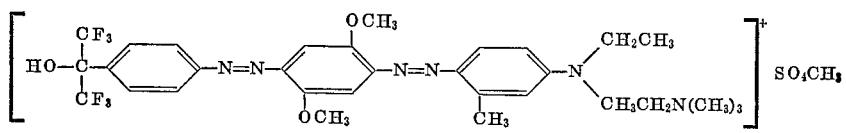

The above color after being ground with an equal weight of dextrin colors Orlon fabric in an attractive washfast maroon shade of execllent levelness and good lightfastness (25 s.f.h.).

EXAMPLES 7–17

In several examples, procedures of diazothiation, coupling and quaternization analogous to those employed in the foregoing examples are employed in preparing the azo dyestuffs and quaternary derivatives thereof listed in the table below.

3,646,050

| Ex. | Diazonium component | Coupling component | Azo dyestuff | Color of dyeing | Quaternary azo dyestuff | Color of dyeing | Light-fastness |
|---|---|---|---|---|---|---|---|
| 7 | Diazonium compound of Example 1, Part B. | Coupling component of Example 6, Part C. | | | | Red on Orlon. | 40 s.f.h. |
| 8 | Diazonium compound of Example 2, Part B. | Diethylaniline. | | | | Violet on Orlon. | 40 s.f.h. |
| 9 | Diazonium compound of Example 1, Part B. | N-phenyl morpholine. | | | | Blue on Orlons | 40 s.f.h. |
| 10 | do | N-ethyl-N-(beta-chloroethyl)-m-toluidine. | | | | Violet on Orlons | 40 s.f.h. |
| 11 | Diazonium compound of Example 2, Part B. | Coupling component of Example 4. | | | | Red on Orlons | 40 s.f.h. |
| 12 | Diazonium compound of Example 1, Part B. | Diethylaniline. | | | | Purple on Orlon | 160 s.f.h. |
| 13 | Diazonium compound of Example 6, Part A. | Coupling component of Example 4. | | | | Yellow on Orlon. | 25 s.f.h. |

| Ex. | Diazonium component | Coupling component | Azo dyestuff | Color of dyeing | Quaternary azo dyestuff | Color of dyeing | Light-fastness |
|---|---|---|---|---|---|---|---|
| 14 | Diazonium compound of Example 2, Part B. | Coupling component of Example 9. | ![structure with CH₃O-C(CF₃)₂-, benzothiazole, N=N, phenyl, N(CH₂CH₂)₂O] | | ![quaternary structure with CH₃O-C(CF₃)₂-, benzothiazole N-CH₃⁺, N=N, phenyl, N(CH₂CH₂)₂O, SO₄CH₃⁻] | Dark blue on Orlon. | 40 s.f.h. |
| 15 | Diazonium compound of Example 1, Part B. | N-(beta-cyanoethyl)-N-(alpha-hydroxypropyl)aniline | ![structure HO-C(CF₃)₂-, benzothiazole, N=N, phenyl, N(CH₂CH₂CN)(CH₂CH₂CH₂OH)] | | | Red on nylon 6,6 and cellulose acetate; orange on Dacron. | |
| 16 | ...do... | N,N-bis-(beta-hydroxyethyl)-m-chloroaniline. | ![structure HO-C(CF₃)₂-, benzothiazole, N=N, phenyl-Cl, N(CH₂CH₂OH)₂] | | | do. | |
| 17 | ...do... | N-ethyl-N-(beta-cyanoethyl)aniline. | ![structure HO-C(CF₃)₂-, benzothiazole, N=N, phenyl-Cl, N(C₂H₅)(CH₂CH₂CN)] | | | Red on Nylon 6,6 and cellulose acetate. | |

I claim:
1. The 2-aminobenzothiazoles which have a substituent in the phenylene ring of the structure

$$X_1-(CF_2)_r-\underset{X_2}{\overset{F}{C}}-\underset{|}{\overset{R_5}{C}}-\underset{X_3}{\overset{F}{C}}-(CF_2)_t-X_4$$

wherein $R_5$ is selected from the group which consists of hydrogen and lower alkoxy of from 1 to 4 carbon atoms; $X_1$, $X_2$, $X_3$ and $X_4$ are halogen selected from the group consisting of fluorine, chlorine, and bromine; and $s$ and $t$ are integers 0 to 1, said phenylene ring optionally containing in addition to said substituent and hydrogen a substituent selected from the group consisting of lower alkyl of from 1 to 4 carbon atoms, lower alkoxy of from 1 to 4 carbon atoms and halogen selected from the group consisting of fluoride, chloride and bromine.

2. A 2-amino-benzothiazole as defined in claim 1 wherein in said 2-amino-benzothiazole is of the structure

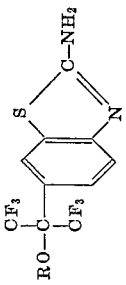

wherein R is selected from the group which consists of hydrogen and methyl.

References Cited

UNITED STATES PATENTS 3,480,612   11/1969   Cain ---------- 260—305

ALEX MAZEL, Primary Examiner

R. J. GALLAGHER, Assistant Examiner